United States Patent [19]

Schmalz

[11] Patent Number: 4,532,846
[45] Date of Patent: Aug. 6, 1985

[54] ARRANGEMENT FOR MANUFACTURING CURVED WALL PORTIONS OF HEAT INSULATING WALLS

[75] Inventor: Gerhardt Schmalz, Biedenkopf, Fed. Rep. of Germany

[73] Assignee: Wezel GmbH & Co KG, Biedenkopf, Fed. Rep. of Germany

[21] Appl. No.: 587,940

[22] Filed: Mar. 9, 1984

Related U.S. Application Data

[62] Division of Ser. No. 277,216, Jun. 25, 1981.

[30] Foreign Application Priority Data

Oct. 29, 1980 [DE] Fed. Rep. of Germany ....... 3040694

[51] Int. Cl.³ .............................................. B26D 1/50
[52] U.S. Cl. ........................................ 83/796; 83/808; 83/811
[58] Field of Search ........................... 83/808, 811, 796

[56] References Cited

U.S. PATENT DOCUMENTS 2,720,230 10/1955 Lockwood et al. ............... 83/811 X
2,726,719 12/1955 Marcalus ........................... 83/808 X

FOREIGN PATENT DOCUMENTS 658843 3/1963 Canada .................................. 83/808

Primary Examiner—Frank T. Yost
Attorney, Agent, or Firm—Michael J. Striker

[57] ABSTRACT

A method of manufacturing curved wall portions of a heat insulating wall for a container having a curved surface, includes the steps of forming a block of heat insulating synthetic foam material with a contour embracing a section of a container surface to be insulated, cutting the block of synthetic foam material over the contour so as to form a curved blank, coating the curved blank with a baffle layer of the same contour, and finally cutting the coated blank along joining surfaces so as to produce a wall portion with final dimensions. An arrangement for manufacturing the wall portions includes a first unit provided with a cutting tool rotatable about a flexible web for cutting a block of heat insulating synthetic foam material over a contour embracing a section of a container surface to be insulated so as to form a curved blank, and a second unit including two pairs of band saws for finally cutting the curved blank coated with a baffle layer along joining surfaces so as to produce a wall portion with final dimensions.

3 Claims, 4 Drawing Figures

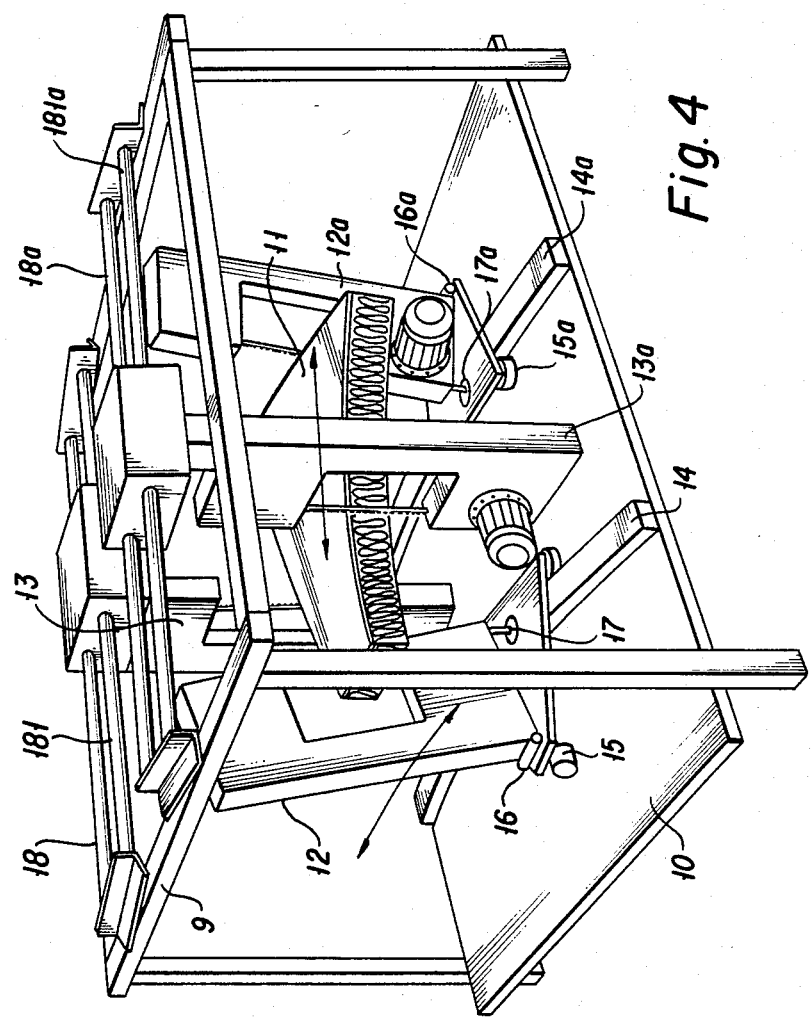

ARRANGEMENT FOR MANUFACTURING CURVED WALL PORTIONS OF HEAT INSULATING WALLS

This is a division of application Ser. No. 277,216 filed June 25, 1981.

BACKGROUND OF THE INVENTION

The present invention relates to a method of manufacturing curved, for example cup-shaped, wall portions of heat insulating walls for insulating containers with curved surfaces, particularly for transportation and storage of liquids. More particularly, the present invention relates to a manufacturing of wall portions of heat insulating walls which include a heat insulating layer of synthetic foam material and a baffle layer, for example a gas-tight layer, constituted of aluminum. The present invention also relates to an arrangement for manufacturing curved wall portions of the above-mentioned heat insulating walls.

Methods of and arrangements for manufacturing such wall portions are known in the art. One known method of manufacturing a heat insulating wall for containers for transporting and storing liquids and gases includes the steps of forming a curved part of the insulating wall in a mold by foaming, applying a baffle layer formed as an aluminum foil onto the foam part and glueing the former to the latter in the correspondingly shaped mold, and mounting the thus produced insulating wall on the container. This solution is, however, not satisfactory inasmuch as a plurality of the molds must be provided which considerably increases the cost of the container.

For avoiding the non-economically high mold costs, another method was proposed in the German Auslegeschrift No. 2,205,965. In accordance with the disclosed method, a flat part is cut from a plate of synthetic foam material and coated with an aluminum sheet which has the same contour and is provided with grain, grating, or wrinkle structures. The thus cut portion coated with the aluminum sheet is pressed under the action of mass pressure in a curved (cup-shaped) mold with a curvature greater than the desired curvature of the wall part to be produced. The curved (cup-shaped) mold must be so stabilized that the aluminum foil having the grain, grating or wrinkle structure retains during closing of the press remaining elongation properties, and the profiling of the aluminum foil leads to straightening of the same. This method also possesses several disadvantages. During opening of the press, the curvature of the cut portion of the plate reduces to a certain extent, whereas during closing of the press not only the outer side of the cut portion with the aluminum foil is elongated, but also the inner side of the cut portion is compressed. The compressed inner side is not fixed in this condition, whereby during opening of the press a certain spring back takes place. The value of the spring back of the cut portion can be determined approximately only from experiments. This means that the accuracy of dimensions in the sense of the radius of curvature cannot be maintained within the required tolerances, and this problem aggravates with the reduction of the radius. It has been recognized that this method is applicable only for very great radii. Finally, in this method each radius of the wall portion requires provision of a respective mold.

Both above described methods possess the disadvantage in the fact that the joining edges of the wall portions do not exactly abut against one another. A wedge shaped gap having greater or smaller width takes place, and it must be filled with a glue serving exclusively for lateral connection of the wall portions with one another. The utilization of expensive glue because of the non-uniformity of the edges of the wall portions can require several tons of glue for insulating such objects as tanks of large liquid fuel tankers.

SUMMARY OF THE INVENTION

Accordingly, it is an object of the present invention to provide a method of manufacturing curved wall portions of heat insulating walls for containers with curved surfaces, such as liquid fuel tanks of tankers, which avoids the disadvantages of the prior art.

More particularly, it is an object of the present invention to provide a method of manufacturing curved wall portions with exact dimensions and in a simple and economical manner.

In keeping with these objects and with others which will become apparent hereinafter, one feature of the present invention resides in a method which includes the steps of forming a block of heat insulating synthetic foam material with a contour embracing a section of a container surface to be insulated, cutting the block of synthetic foam material over the contour so as to form a curved blank, coating the curved blank with a baffler layer of the same contour, and finally cutting the coated blank along joining surfaces so as to produce a wall portion with final dimensions. When the method is performed in accordance with the present invention, the wall portion is manufactured with required exact dimensions and in a very simple and economical way.

In accordance with another feature of the present invention, the coating step includes providing a piece of baffle material, deforming the piece of the baffle material so that it assumes a curved shape, and glueing the deformed piece of baffle material to the curved blank of synthetic foam material.

In accordance with still another feature of the present invention, the coating step includes assembling the baffle layer of a plurality of sections of baffle material, and glueing the sections of the baffle material onto the curved blank of synthetic foam material, without deforming the former.

Another object of the present invention is to provide an arrangement for manufacturing curved wall portions of a heat insulating wall for a container with a curved surface, which avoids the disadvantages of the prior art and implements the inventive method. In keeping with this object, the arrangement includes a first unit for cutting a block of heat insulating synthetic foam material over a contour embracing a section of a container surface to be insulated, so as to form a curved blank, and a second unit for finally cutting the curved blank coated with a baffle layer along joining surfaces so as to produce a wall portion with final dimensions.

The first unit includes an elongated flexible web having outer edges, and cutting tool, such as a wire saw, rotating along said outer edges of the flexible web and having end turning axes in which it is driven for rotation. The second unit for finally cutting the curved blank includes a plurality of band saws each arranged to finally cut a respective one of the joining surfaces. These band saws may include two saws which are supported from below and cut inner and outer circular sides of the wall portion formed as a circular segment, and two further band saws which are suspended from above and cut radial lines of the thus shaped wall portion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a view showing a unit for cutting joining surfaces of the curved blank, which forms another part of the arrangement in accordance with the present invention.

DESCRIPTION OF THE PREFERRED EMBODIMENTS

A method of manufacturing curved wall portions of a heat insulating wall for a container with a curved surface, such as a cup-shaped surface, includes formation of a block of heat insulating synthetic foam material which is roughly shaped, or more particularly has a contour embracing a section of a container surface to be insulated. The block of synthetic foam material is cut over its contour so as to form a curved (cup-shaped) blank. The thus produced curved blank is coated with a baffle layer of the same contour. Finally, the thus coated blank is cut along joining surfaces so as to produce a wall portion with its final dimensions. The original block of heat insulating synthetic plastic material may be roughly shaped as a circular segment, so that after final cutting, the wall portion is produced which is shaped as a circular segment. The baffle layer or gas-tight layer may be constituted of metal or synthetic plastic material.

Coating of the block of synthetic foam material with the layer of baffle material may be performed in different ways. For example, a piece of baffle material may be provided, then this piece is deformed so as to assume a curved shape, and thereafter the curved piece is glued to the curved blank of synthetic foam material. In contrast, the baffle layer may be assembled of a plurality of sections of baffle material which are glued onto the curved blank of synthetic foam material without deforming the former.

An arrangement for manufacturing curved wall portions of a heat insulating wall for containers with curved surfaces in accordance with the present invention includes a unit for cutting a curved (cup-shaped) blank of a roughly, shaped block of synthetic foam material, and a unit for exact cutting the joining surfaces of the wall portion.

Figure 1:
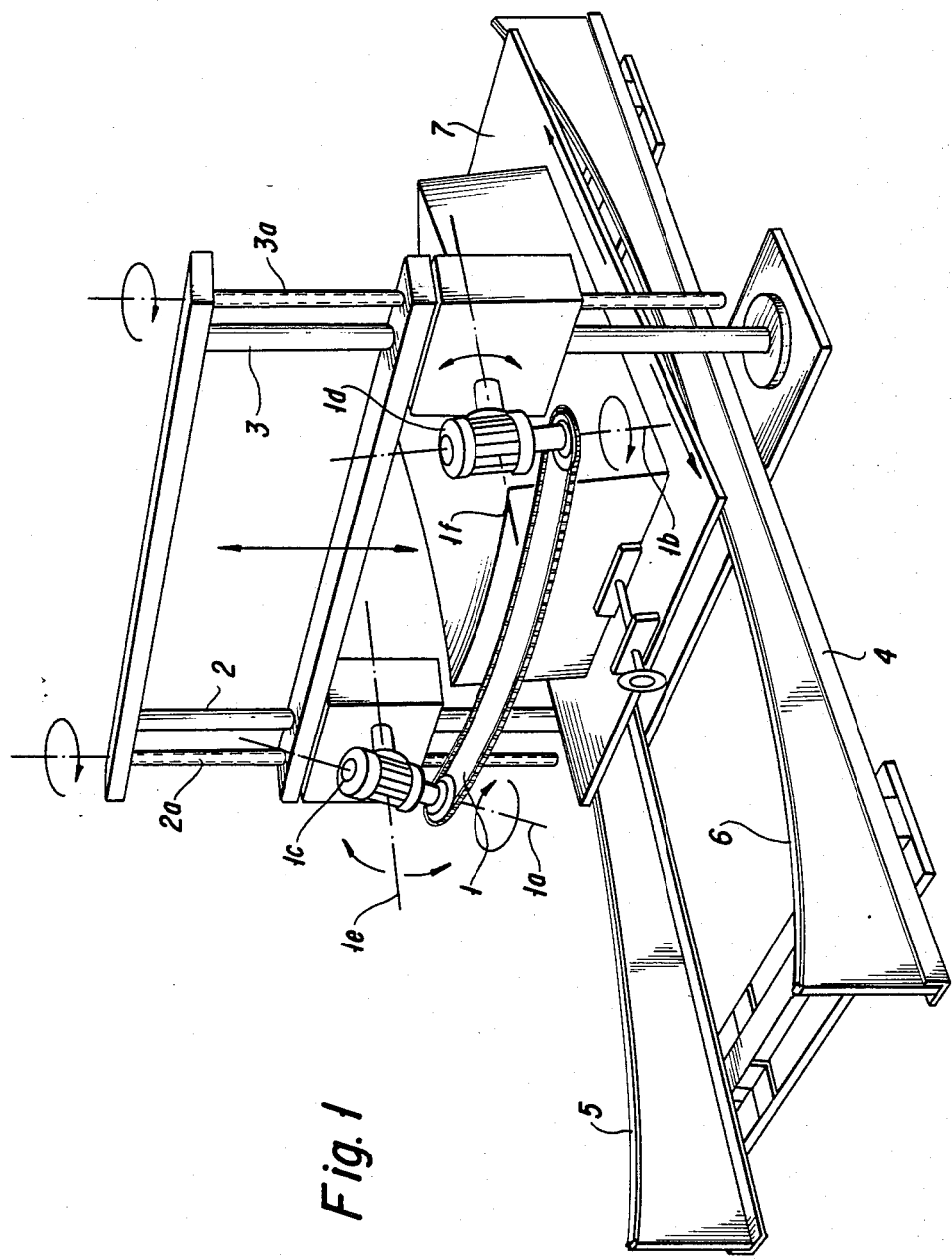
FIG. 1 is a perspective view showing a unit for cutting a curved (cup-shaped) blank from a block of insulating synthetic foam material, which is a part of an arrangement for manufacturing curved wall portions in accordance with the present invention.
Figure 2:
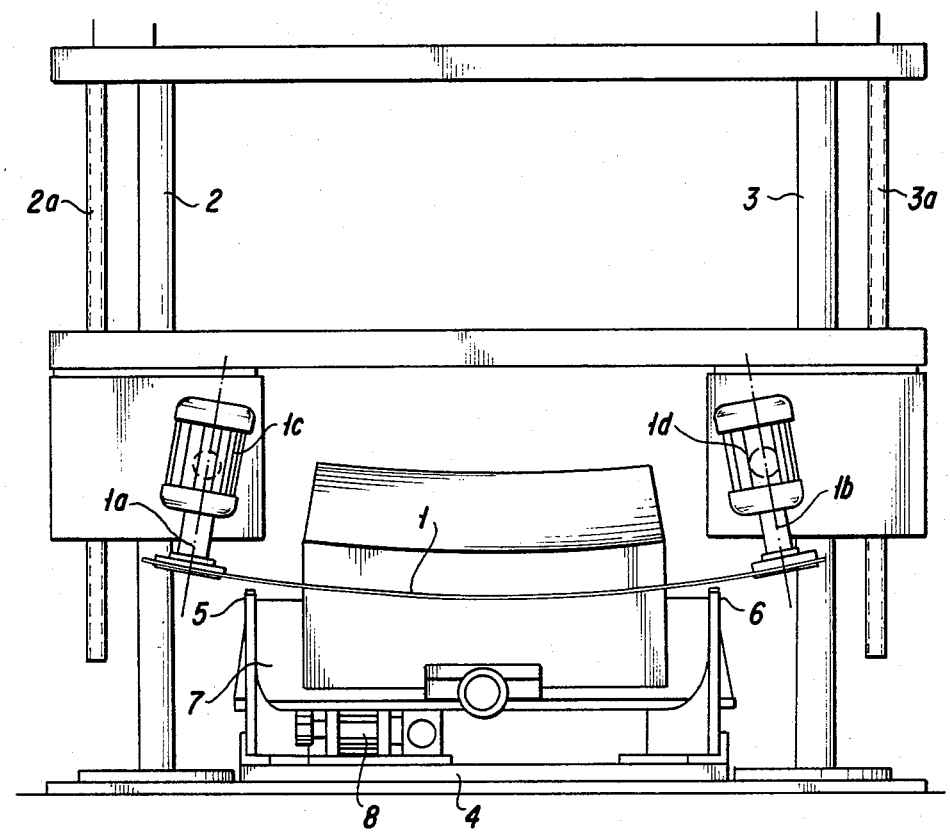
FIG. 2 is a view showing the unit of FIG. 1, as seen in a direction of cutting.
Figure 3:
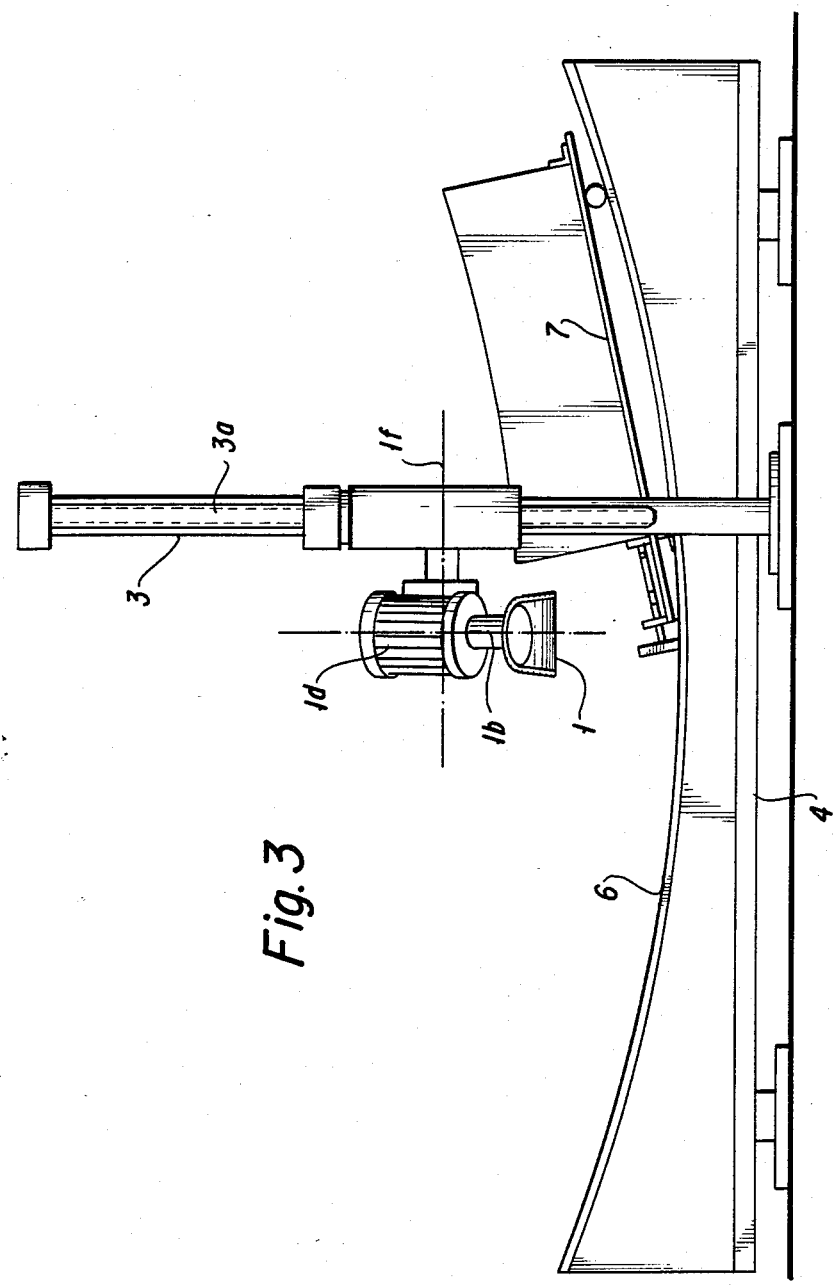
FIG. 3 is a view of the unit shown in FIG. 1, as seen in a direction which is transverse to the direction of cutting.

The first mentioned unit for cutting the curved blank is shown in FIGS. 1-3 and has a chain saw 1 with a flexible web and a saw chain running along the edges of the web and driven in rotation by electric motors 1c and 1d arranged in the regions of turning axes 1a and 1b. The chain saw 1 is movably mounted with its both ends on vertical guiding bars 2 and 3 and can be fixed at each desired height.

The turning axes 1a and 1b of the chain saw 1 can be inclined relative to one another about horizontal axes of inclination 1e and 1f which are parallel to the cutting direction of the chain saw. The web of the chain saw is bendable downwardly, advantageously in the central region thereof. The turning axes 1a and 1b can be fixed in each inclined position. Thereby the chain saw assumes a cutting surface which has a curvature adjustable within certain limit and extending transverse to the cutting direction.

The upward and downward movements of the chain saw 1 along the guiding bars 2 and 3 for adjusting of the cutting height is performed with the aid of two synchronously operating spindle drives 2a and 3a. The spindle drives 2a and 3b extend parallel to the guiding bars 2 and 3 and are located adjacent to the latter. It is also possible to form the above-mentioned drives as two synchronously operating cylinder-and-piston units.

The upright guiding bars 2 and 3 are arranged in the central region of longitudinal sides of a frame 4. The frame 4 carries a pair of exchangeable guiding rails 5 and 6 which extend in a longitudinal direction. A four cornered plate 7 is provided with rollers and reciprocates with the aid of the latter on the guiding rails 5 and 6 in cutting direction of the chain saw 1. The guiding rails 5 and 6 are curved and their curvature determines the curvature produced by the chain saw 1 in the cutting direction.

A plurality of pairs of such guiding rails 5 and 6 may be provided having different radii of curvature. The guiding rails are mounted on the frame detachably, and it is possible to mount on the frame another pair of the guiding rails having a differing radius of curvature so as to produce the curved blank with the required radius of curvature.

The plate 7 is provided with means for clamping a roughly shaped block of synthetic foam material. A drive is arranged on the frame 4 under the plate 7 and includes an electric motor 8 operative for reciprocating the plate 7 under the chain saw 1. The speed of movement of the plate 7 corresponds to the cutting speed of the chain saw 1. The chain saw 1 has two cutting edges. Thereby during each stroke of the plate 7 with the block of synthetic foam material 2 and 4 under the chain saw 1, a respectively thick curved disc of the block is cut off.

The guiding rails of this unit may be formed in a somewhat different way. These guiding rails may be constituted of flexible material and fixed within certain limits to each required curvature or even a straight line. As described above, the block of synthetic foam material is reciprocable relative to the stationary cutting chain. It is also possible to support the block stationarily and to drive the saw chain in a reciprocating movement, whereas the guiding bars may be displaced linearly in the cutting direction and perform a swinging movement for obtaining the desired curvature of the cutting surface.

This option may be designed so that the chain saw with its vertical guiding bars is suspended on horizontal guiding rails which extend through the stationary plate in the cutting direction, whereas the vertical guiding bars are suspended so as to swing in the cutting direction. In such a construction, the curved discs are again cut off from the upper side of the block of synthetic foam material and must be removed by hand after the completion of the cut.

The clamping means for retaining the block of synthetic foam material may be provided not below, but above the chain saw. In this case, the discs are cut off from the lower side of the block. After the completion of each cut, the discs can follow onto a transporting element and be transported to the next working station without manual operations.

The above-described unit can provide for cutting not only cup-shaped blocks. It can also produce blocks having surfaces with other curved shapes, such as for example, an outer surface of a cylinder, a cone, or other rotation symmetrical bodies.

FIG. 4 shows a second unit of the inventive arrangement, for cutting four joining surfaces of a wall portion which is shaped, for example, as a circular segment. The second unit has four posts supporting a four cornered frame 9 and a table 10 arranged in the lower region of the same. A cut blank 11 is supported within its inner side on the table 10 and fixed thereon. Two band saws 12 and 12a are movably arranged on the table 10 at two opposite sides of the latter. The band saws 12 and 12a are provided for cutting the wall portion along inner and outer circular lines of the circular segment. Two further band saws 13 and 13a are arranged at two other sides of the table 10 and are movably suspended from the frame 9. The band saws 13 and 13a are arranged for cutting the radial lines of the wall portion formed as a circular segment.

Two guiding rails 14 and 14a curved in accordance with the circular lines of the segment are changeably mounted on the table 10. The band saws 12 and 12a are provided with base portions 15 and 15a which are equipped with rollers and roll over the guide rails 14 and 14a.

The band saws 12 and 12a which are mounted in standing condition can be inclined within certain limits relative to their base portions 15 and 15a about axes 16 and 16a extending parallel to the cutting direction. Threaded spindles 17 and 17a fix the band saws 12 and 12a in each desired inclined position. The above-described adjustment of the inclination of these band saws is necessary inasmuch as the angle between the axes of rotation of the container to be insulated and the plane formed by the four corners of the respective cut blank (table plane) changes from segment to segment both for the identical radius of curvature and for other radii of curvature of the wall portions.

The band saws 13 and 13a provided for cutting the radial lines of the wall portions are suspended on the frame 9 in a substantially vertical position, each with the aid of a pair of guiding bars 18, 181 and 18a, 181a so as to move in the cutting direction of these band saws. The plane of at least one bar of each pair of the bars is inclinable relative to the plane of the other bar of the same pair and fixable in each desired inclination thereof. Thereby the planes of both bars of the same pair extend not parallel to one another, and as a result of this the inclination of the respective band saw changes during the cutting process.

This is necessary inasmuch as the position of the cut blank which rests with its all four corners on the table, relative to the course of the edges angle does not correspond to its arrangement on the curved surface of the container to be insulated. The cutting edges extending along the radial lines must extend, relative to the plane of the table, in a helical manner, so that they correspond to the meridian plane on the outer surface of the container to be insulated.

It will be understood that each of the elements described above, or two or more together, may also find a useful application in other types of constructions differing from the types described above.

While the invention has been illustrated and described as embodied in an arrangement for manufacturing a curved wall portion of a heat insulating wall for a container having a curved surface, it is not intended to be limited to the details shown, since various modifications and structural changes may be made without departing from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An arrangement for manufacturing curved wall portions of a heat insulating wall for a container with a curved surface, the heat insulating wall having a heat-insulating layer of synthetic foam material and a baffle layer associated therewith, the arrangement comprising a unit for cutting the curved blank coated with a baffle layer along joining surfaces so as to produce a wall portion with final dimensions, said unit being arranged for cutting the blank shaped as a circular segment and including a four-cornered frame element supported on upright posts at its corners, a four-sided table member arranged in a lower region between said posts and supporting the curved blank, two first band saws arranged on said table element at two opposite sides of the latter and movable along two circular lines to cut inner and outer circular sides of the blank formed as a circular segment, two second band saws suspended from said frame element at two other opposite sides of said table member and movable along radial lines so as to cut radial sides of the blank formed as a circular segment, first guiding means for guiding said first band saws and including two first guiding members curved in accordance with the two circular lines and movably supporting said first band saws during their movement along the circular lines, second guiding means for guiding said second band saws and including two pairs of substantially horizontal guiding members curved in accordance with the radial lines and each movably suspending a respective one of said second band saws during their movement along said radial lines, first means for inclining each of said first band saws about an axis parallel to their cutting direction between a plurality of first inclined positions and fixing the same in each of said first inclined positions, and second inclining means for inclining one said guiding member of each pair of said second guiding members relative to the other second guiding member of the same pair of said second guiding member between a plurality of second inclined positions and fixing the same in each of said second inclined positions.

2. An arrangement as defined in claim 1, wherein said first guiding members are formed as two guiding rails curved in accordance with the inner and outer circular lines of the circular segment, and a plurality of rollers each supporting a respective one of said first saw blades and rolling over said guiding rails.

3. An arrangement as defined in claim 2, wherein each of said first band saws has a base member provided with said rollers and is inclinable relative to said base member between said plurality of first inclined positions and fixable in each of said first inclined positions.

* * * * *